United States Patent
Pei

(10) Patent No.: US 10,844,999 B2
(45) Date of Patent: Nov. 24, 2020

(54) DISPLAY MOUNTING APPARATUS

(71) Applicant: Xubo Pei, Shenzhen (CN)

(72) Inventor: Xubo Pei, Shenzhen (CN)

( * ) Notice: Subject to any disclaimer, the term of this patent is extended or adjusted under 35 U.S.C. 154(b) by 0 days.

(21) Appl. No.: 16/512,677

(22) Filed: Jul. 16, 2019

(65) Prior Publication Data

US 2020/0340617 A1    Oct. 29, 2020

(30) Foreign Application Priority Data

Apr. 25, 2019    (CN) .................... 2019 2 0599656 U

(51) Int. Cl.
| | |
|---|---|
| *E04G 3/00* | (2006.01) |
| *F16M 13/02* | (2006.01) |
| *F16M 11/04* | (2006.01) |
| *F16M 11/10* | (2006.01) |

(52) U.S. Cl.
CPC .......... *F16M 13/02* (2013.01); *F16M 11/041* (2013.01); *F16M 11/10* (2013.01)

(58) Field of Classification Search
CPC .............. F16M 11/2092; F16M 11/10; F16M 11/2014; F16M 11/24; F16M 11/38
See application file for complete search history.

(56) References Cited

U.S. PATENT DOCUMENTS

| | | | |
|---|---|---|---|
| 2005/0006543 A1* | 1/2005 | Oddsen, Jr. ............ | F16M 11/24 248/279.1 |
| 2008/0035816 A1* | 2/2008 | Ciungan ............ | F16M 11/2092 248/276.1 |
| 2010/0123061 A1* | 5/2010 | Vlies .................. | F16M 11/2014 248/220.1 |
| 2016/0281918 A1* | 9/2016 | Geier ...................... | F16M 11/38 |
| 2016/0353885 A1* | 12/2016 | Feldman ................ | F16M 11/10 |

* cited by examiner

*Primary Examiner* — Amy J. Sterling
(74) *Attorney, Agent, or Firm* — Maier & Maier, PLLC

(57) ABSTRACT

A display mounting apparatus includes a wall plate, a telescopic adjustment assembly, an adjustment bracket and a display bracket. The wall plate includes a first pivoting part and a second pivoting part. The telescopic adjustment assembly includes a first front rotating lever, a second front rotating lever, a hollow sleeve, a middle rotating shaft and a rear rotating lever. The first front rotating lever and the second front rotating lever respectively rotatably couples the first pivoting part and the second pivoting part. The hollow sleeve couples between the first front rotating lever and the second front rotating lever and is disposed away from wall plate. One end of the rear rotating lever is fixed to a portion between two ends of the hollow sleeve. The adjustment bracket rotatably couples one end of the rear rotating lever away from the hollow sleeve. The display bracket is mounted on the adjustment bracket.

16 Claims, 1 Drawing Sheet

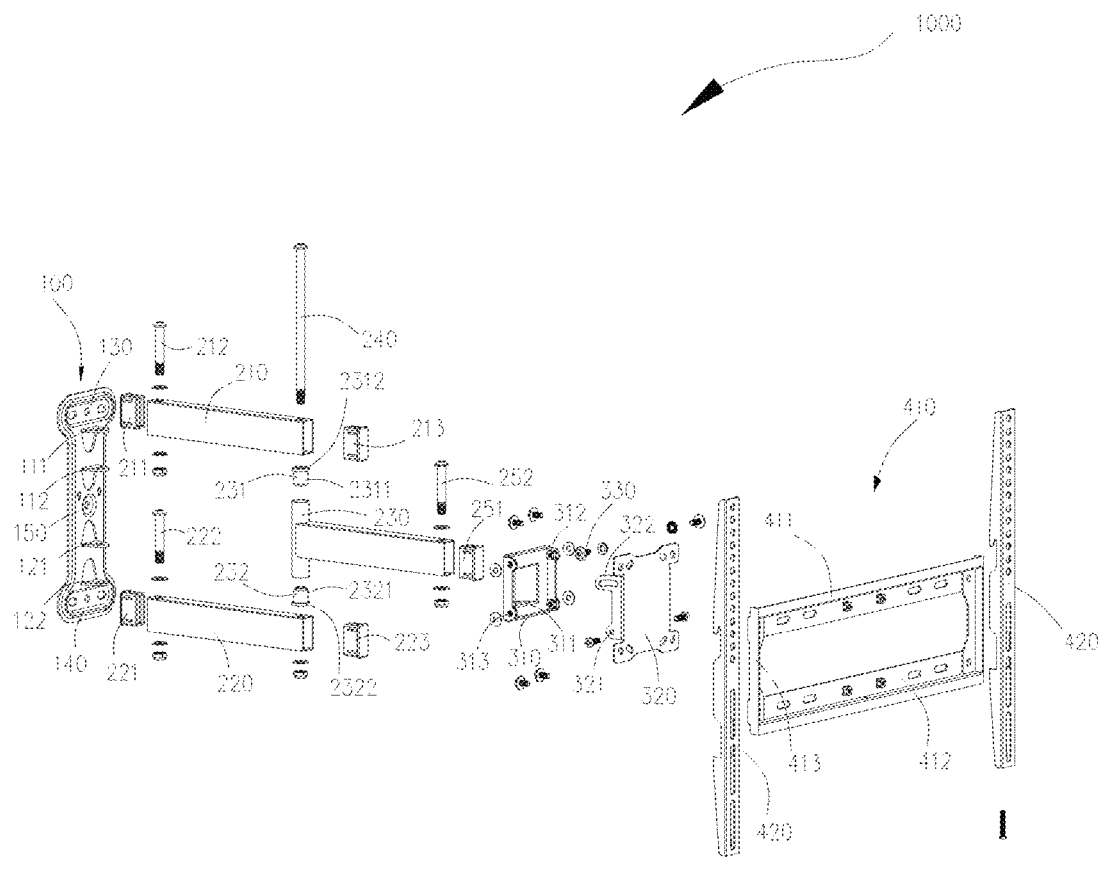

DISPLAY MOUNTING APPARATUS

TECHNICAL FIELD

The present disclosure relates to a field of installation equipment, and in particular to, a display mounting apparatus.

BACKGROUND

At present, after a telescopic adjustment assembly of a display mounting bracket is completely folded, a central axis of a display is staggered relative to a central axis of a wall plate, so that the user must adjust a position of the display as needed when installing the display mounting bracket, which reduces user experiences.

SUMMARY

The present disclosure provides a display mounting apparatus to cure deficiencies of the prior art.

The present disclosure provides a display mounting apparatus. The display mounting apparatus includes a wall plate, a telescopic adjustment assembly, an adjustment bracket, and a display bracket. The wall plate includes a first pivoting part and a second pivoting part disposed opposite to the first pivoting part. The telescopic adjustment assembly includes a first front rotating lever, a second front rotating lever, a hollow sleeve, a middle rotating shaft, and a rear rotating lever. The first front rotating lever and the second front rotating lever are rotatably coupled to the first pivoting part and the second pivoting part respectively. The hollow sleeve is rotatably coupled between the first front rotating lever and the second front rotating lever, and further disposed away from the wall plate. The middle rotating shaft sequentially passes through the first front rotating lever, the hollow sleeve and the second front rotating lever. One end of the rear rotating lever is fixed to a portion between two ends of the hollow sleeve. The adjustment bracket is rotatably coupled to one end of the rear rotating lever away from the hollow sleeve. The display bracket is mounted on the adjustment bracket. When the display bracket is folded relative to the wall plate, the display bracket is received between the first pivoting part and the second pivoting part.

Wherein, the first pivoting part includes a first upper clamping plate and a first lower clamping plate disposed opposite to the first upper clamping plate. One end of the first front rotating lever rotatably couples the first upper clamping plate and the first lower clamping plate. The second pivoting part includes a second upper clamping plate and a second lower clamping plate disposed opposite to the second upper clamping plate. One end of the second front rotating lever rotatably couples the second upper clamping plate and the second lower clamping plate.

Wherein, the wall plate defines a first upper through hole, a first lower through hole, a first upper through hole and a second lower through hole which are arranged in order. The first upper clamping plate, the first lower clamping plate, the second upper clamping plate and the second lower clamping plate are respectively disposed at edges of the first upper through hole, the first lower through hole, the first upper through hole, and the second lower through hole.

Wherein, the wall plate includes an upper fixed end and a lower fixed end disposed opposite to the upper fixed end, and a supporting part disposed between the upper fixed end and the lower fixed end. The first upper through hole, the first lower through hole, the first upper through hole, and the second lower through hole, and the first upper clamping plate, the first lower clamping plate, the second upper clamping plate, and the second lower clamping plate are all disposed on the supporting part.

Wherein, the telescopic adjustment assembly further includes a first plastic spacer and a second plastic spacer. The first plastic spacer and the second plastic spacer are respectively fixed at two ends of the hollow sleeve, and respectively abut against the first front rotating lever and the second front rotating lever. The middle rotating shaft passes through the first plastic spacer and the second plastic spacer.

Wherein, the telescopic adjustment assembly further includes a first front pipe plug, a second front pipe plug, a first front rotating shaft and a second front rotating shaft. The first front rotating lever has an intermediate hollow tubular structure, and the second front rotating lever has an intermediate hollow tubular structure. The first front pipe plug and the second front pipe plug are respectively inserted into one end of the first front rotating lever and one end of the second front rotating lever. The first front rotating shaft passes through the end of the first front rotating lever and the first front pipe plug, and is then rotatably coupled to the first pivoting part. The second front rotating shaft passes through the end of the second front rotating lever and the second front pipe plug and is then rotatably coupled to the second pivoting part.

Wherein, the telescopic adjustment assembly further includes a rear pipe plug and a rear rotating shaft. The rear rotating lever has an intermediate hollow tubular structure. The rear pipe plug is inserted into one end of the rear rotating lever away from the hollow sleeve. The rear rotating shaft passes through the end of the rear rotating lever and the rear pipe plug, and is rotatably coupled to the adjustment bracket.

Wherein, the adjustment bracket includes a rotating base rotatably coupled to the rear rotating lever and a tilting base rotatably coupled to the rotating base. A rotating direction of the rotating base rotating relative to the rear rotating lever is parallel to a rotating direction of the rear rotating lever rotating relative to the first front rotating lever. A rotating direction of the tilting base rotating rotating relative to the rotating base is perpendicular to a rotating direction of the rotating base rotating relative to the rear rotating lever. The display bracket is fixed to the tilting base.

Wherein, the adjustment bracket further includes a tilting adjustment bolt. The tilting adjustment bolt passes through the rotating base and the tilting base to stabilize a rotating angle of the tilting base relative to the rotating base.

Wherein, the display bracket includes a fixed frame and two hanging strips which can be mounted on the fixed frame. The fixed frame is fixed on the adjustment bracket, and the two hanging strips can be fixed on a back of a display.

In the display mounting apparatus of the present disclosure, the wall plate includes a first pivoting part and a second pivoting part, the telescopic adjustment assembly includes a first front rotating lever and a second front rotating lever respectively rotatably coupled to the first pivoting part and the second pivoting part, and a rear rotating lever rotatably coupled to the first front rotating lever and the second front rotating lever. The adjustment bracket can follow the rear rotating lever to be folded relative to the wall plate so as to receive between the first pivoting part and the second pivoting part, such that the display bracket can be completely folded relative to the wall plate, which is convenient for a central axis of the display aligned with a central axis of the wall plate to improve the user experience.

BRIEF DESCRIPTION OF THE ACCOMPANYING DRAWINGS

In order to more clearly illustrate the technical solutions in the embodiments of the present disclosure, the drawings to be used in the embodiments will be briefly described below. Obviously, the drawings in the following description are only some embodiments of the present disclosure, those skilled in the art can also obtain other obvious modifications according to these drawings without any creative work.

FIG. 1 is an exploded diagram of the display mounting apparatus provided by the present disclosure.

DETAILED DESCRIPTION OF ILLUSTRATED EMBODIMENTS

The technical solutions in the embodiments of the present disclosure will be clearly described with reference to the drawings in the embodiments of the present disclosure. It is obvious that the described embodiments are only a part of the embodiments of the present disclosure, and not all of the embodiments. All other embodiments obtained by those skilled in the art based on the embodiments of the present disclosure without creative efforts are within the scope of the present disclosure.

It should be noted that when a component is referred to as being "fixed" to another component, it can be directly on another component or possibly a central component. When a component is considered to "connect" another component, it can be directly connected to another component or possibly a central component.

All technical and scientific terms used herein have the same meaning as commonly understood by one of ordinary skilled in the art. The terms used in the description of the present disclosure are for the purpose of describing particular embodiments and are not intended to limit the present disclosure. The term "and/or" used herein includes any and all combinations of one or more of the associated listed items.

Some embodiments of the present disclosure are described in detail below with reference to the accompanying drawings. The features of the embodiments and examples described below can be combined with each other without conflict.

Referring to FIG. 1, the present disclosure provides a display mounting apparatus 1000. The display mounting apparatus 100 includes a wall plate 100, a telescopic adjustment assembly 200, an adjustment bracket 300, and a display bracket 400. The wall plate 100 includes a first pivoting part 110 and a second pivoting part 120 disposed opposite to the first pivoting part 110. The telescopic adjustment assembly 200 includes a first front rotating lever 210, a second front rotating lever 220, a hollow sleeve 230, a middle rotating shaft 240, and a rear rotating lever 250. The first front rotating lever 210 and the second front rotating lever 220 are rotatably coupled to the first pivoting part 110 and the second pivoting part 120, respectively. The hollow sleeve 230 is rotatably coupled between the first front rotating lever 210 and the second front rotating lever 220 and is disposed away from the wall plate 100. The middle rotating shaft 240 sequentially passes through the first front rotating lever 210, the hollow sleeve 230, and the second front rotating lever 220. One end of the rear rotating lever 250 is fixed to a portion between two ends of the hollow sleeve 230. The adjustment bracket 300 is rotatably coupled to one end of the rear rotating lever 250 away from the hollow sleeve 230. The display bracket 400 is mounted on the adjustment bracket 300. When the display bracket 400 is folded relative to the wall plate 100, the adjustment bracket 300 can be received between the first pivoting part 110 and the second pivoting part 120.

It can be understood that the wall plate 100 can be fixed on a wall surface of a wall, or can be fixed on a wall surface of a load-bearing column, or can be fixed on a cabinet of a decorative cabinet or fixed to a wall surface of a decorative wall plate. The display bracket 400 can be used to fix a display. The display may be a flat panel television, or an electronic device having a display function such as a liquid crystal display, or a tablet computer, or a display terminal.

As the wall plate 100 includes the first pivoting part 110 and the second pivoting part 120, and the telescopic adjustment assembly 200 includes a first front rotating lever 210 and a second front rotating lever 220 that are rotatably coupled to the first pivoting part 110 and the second pivoting part 120, respectively, and a rear rotating lever 250 that is rotatably coupled to the first front rotating lever 210 and the second front rotating lever 220. When the adjustment bracket 300 follows the rear rotating lever 220 to be folded relative to the wall plate 100, the adjustment bracket 300 may be received between the first pivoting part 110 and the second pivoting part 120, such that the display bracket 400 can be completely folded relative to the wall plate 100, which is convenient for a central axis of the display aligning with a central axis of the wall plate 100 to improve the user experience.

In this embodiment, the wall plate 100 can be fixed to the wall by fasteners such as screws, bolts, pins, etc., so that the wall plate 100 provides a bearing platform for the display bracket 400. The wall plate 100 has a substantially flat plate structure, which facilitates installation of the wall plate 100 parallel to the wall surface of the wall, and can increase a stability of the connection between the wall plate 100 and the wall. The wall plate 100 has one side that can be attached to the wall, and the other side away from the wall that couples the telescopic adjustment structure 200. The display is stabilized on the wall by a display fixing structure 300, so that display information can be displayed on the wall.

Specifically, the wall plate 100 includes an upper fixed end 130 and a lower fixed end 140 disposed opposite to the upper fixed end 130, and a supporting part 150 disposed between the upper fixed end 130 and the lower fixed end 140. The first pivoting part 110 and the second pivoting part 120 are disposed on the supporting part 150. The first pivoting part 110 includes a first upper clamping plate 111 and a first lower clamping plate 112 disposed opposite to the first upper clamping plate 111. The first upper clamping plate 111 is parallel to the first lower clamping plate 112. A direction of the first upper clamping plate 111 relative to the first lower clamping plate 112 is parallel to a direction of the upper fixed end 130 relative to the lower fixed end 140. One end of the first front rotating lever 210 is rotatably coupled between the first upper clamping plate 111 and the first lower clamping plate 112. The second pivoting part 120 includes a second upper clamping plate 121 and a second lower clamping plate 122 disposed opposite to the second upper clamping plate 121. The second upper clamping plate 121 is parallel to the second lower clamping plate 122. A direction of the upper upper clamping plate 121 relative to the second lower clamping plate 122 is parallel to a direction of the lower fixed end 130 relative to the lower fixed end 140. One end of the second front rotating lever 220 rotatably couples the second upper clamping plate 121 and the second lower clamping plate 122. A rotating direction of the first front rotating lever 210 is parallel to a rotating direction of the second front rotating lever 220. A rotating axis of the first front rotating lever 210 is substantially parallel to the wall plate 100 and substantially parallel to a direction of the upper fixed end 130 relative to the lower fixed end 140.

The upper fixed end 130 defines a plurality of upper fixing holes 131, and the lower fixed end 140 defines a plurality of lower fixing holes 141. The upper fixing holes 131 and the lower fixing holes 141 may be screwed into screws or bolts so that the upper fixed end 130 and the lower fixed end 140 can be fixed to the wall.

The supporting part 150 defines a first upper through hole 151 adjacent to the first upper clamping plate 111, a first lower through hole 152 adjacent to the first lower clamping plate 112, a first upper through hole 153 adjacent to the second upper clamping plate 121, and a second lower through hole 154 adjacent to the second lower clamping plate 122. The first upper through hole 151, the first lower through hole 152, the first upper through hole 153, and the second lower through hole 154 are all formed by a stamping process. The first upper clamping plate 111, the first lower clamping plate 112, the second upper clamping plate 121, and the second lower clamping plate 122 are formed by a press bending process, that is, the first upper clamping plate 111, the first lower clamping plate 112, the first upper clamping plate 112, the second upper clamping plate 121, and the second lower clamping plate 122 are integrated with the supporting part 150 to increase a stable structure of the wall plate 100.

Furthermore, the telescopic adjustment assembly 200 further includes a first plastic spacer 231 and a second plastic spacer 232 respectively fixed to the two ends of the hollow sleeve 230 and further respectively abutting the first front rotating lever 210 and the second front rotating lever 240. The middle rotating shaft 240 passes through the first plastic spacer 231 and the second plastic spacer 232.

In this embodiment, the first plastic spacer 231 includes a first insertion 2311 and a first partition 2312 fixed to one end of the first insertion 2311. The first insertion 2311 is inserted into one end of the hollow sleeve 230. The first partition 2312 may separate the hollow sleeve 230 from the first rotating front rod 210 to prevent a rotating friction between the first front rotating lever 210 and the hollow sleeve 230. The second plastic spacer 232 includes a second insertion 2321 and a second partition 2322 fixed to one end of the second insertion 2321. The second insertion 2321 is inserted into one end of the hollow sleeve 230 away from the first plastic spacer 231. The second partition 2322 may separate the hollow sleeve 230 from the second rotating front rod 220 to prevent a rotating friction between the second front rotating lever 220 and the hollow sleeve 230. An outer peripheral side wall of the middle rotating shaft 240 is clearance-fitted with an inner peripheral side wall of the first plastic spacer 231, and is clearance-fitted with an inner peripheral side wall of the second plastic spacer 232 to make the middle rotating shaft 240 separate the middle rotating shaft 240 from the hollow sleeve 230, so as to prevent a friction between the middle rotating shaft 240 and the hollow sleeve 230.

Furthermore, the telescopic adjustment assembly 200 further includes a first front pipe plug 211, a second front pipe plug 221, a first front rotating shaft 212, and a second front rotating shaft 222. The first front rotating lever 210 has an intermediate hollow tubular structure. The second front rotating lever 220 has an intermediate hollow tubular structure. The first front pipe plug 211 and the second front pipe plug 221 are respectively inserted into an end of the first front rotating lever 210 and an end of the second front rotating lever 220. The first front rotating shaft 212 passes through the end of the first front rotating lever 210 and the first front pipe plug 211 and is further rotatably coupled to the first pivoting part 110. The second front rotating shaft 222 passes through the end of the second front rotating lever 220 and the second front pipe plug 221 and is further rotatably coupled to the second pivoting part 120.

In this embodiment, the first front pipe plug 211 has a substantially rectangular block shape. The first front pipe plug 211 is a plastic piece. The first front rotating lever 210 is substantially rectangular tubular shape. The first front rotating shaft 212 sequentially passes through the first upper clamping plate 111, the first front rotating lever 210, the first front pipe plug 211, and the first lower clamping plate 112. The first front rotating lever 210 is rotatably coupled to the wall plate 100 through the first front rotating shaft 212. The first front pipe plug 211 has a substantially rectangular block shape. The second front pipe plug 221 is a plastic piece. The first front rotating lever 210 is substantially rectangular tubular shape. The second front rotating shaft 222 sequentially passes through the second upper clamping plate 121, the second front rotating lever 220, the second front pipe plug 221, and the second lower clamping plate 122. The second front rotating lever 220 is rotatably coupled to the wall plate 100 through the second front rotating shaft 222. Of course, in other embodiments, the first front rotating lever 210 may also have a circular tubular shape. The first front pipe plug 211 may also be substantially cylindrical shape. The second front rotating lever 220 may also have a circular tubular shape. The second front pipe plug 221 can also be substantially cylindrical shape.

In this embodiment, the telescopic adjustment assembly 200 further includes a first middle pipe plug 213 and a second middle pipe plug 223. The first middle pipe plug 213 is a plastic piece. The first middle pipe plug 213 is inserted into one end of the first front rotating lever 210 away from the first front pipe plug 211. The middle rotating shaft 240 passes through the first middle pipe plug 213 and the first front rotating lever 210. The second middle pipe plug 223 is a plastic piece. The second middle pipe plug 223 is inserted into one end of the second front rotating lever 220 away from the second front pipe plug 221. The middle rotating shaft 240 passes through the second middle pipe plug 223 and the second front rotating lever 220. The first middle pipe plug 213 and the second middle pipe plug 223 respectively strengthen a structural strength of the first front rotating lever 210 and the second front rotating lever 220 to increase a bearing performance of the telescopic adjustment assembly 200.

Furthermore, the telescopic adjustment assembly 200 further includes a rear pipe plug 251 and a rear rotating shaft 252. The rear rotating lever 250 has an intermediate hollow tubular structure, and the rear pipe plug 251 is inserted into one end of the rear rotating lever 250 away from the hollow sleeve 230. The rear rotating shaft 252 passes through the end of the rear rotating lever 250 and the rear pipe plug 251 and is rotatably coupled to the adjustment bracket 300. The rear pipe plug 251 reinforces a strength of the end of the rear rotating lever 250 to stabilize a rotating structure of the rear rotating lever 250 and the adjustment bracket 300.

Furthermore, the adjustment bracket 300 includes a rotating base 310 that rotatably connects the rear rotating lever 250 and a tilting base 320 that rotatably connects the rotating base 310. A rotating direction of the rotating base 310 rotating relative to the rear rotating lever 250 is parallel to a rotating direction of the rear rotating lever 250 rotating relative to the first front rotating lever 210. A rotating direction of the tilting base 320 rotating relative to the rotating base 310 is perpendicular to a rotating direction of the rotating base 310 rotating relative to the rear rotating lever 250, and the display bracket 400 is fixed to the tilting base 320.

In this embodiment, the rotating base 310 includes a rotating plate 311. The rotating plate 311 is substantially perpendicular to the wall plate 100. The rear rotating shaft 252 passes through the rear rotating lever 250 and the rotating plate 311 such that the rotating base 310 is rotatable relative to the rear rotating lever 250. One side of the rotating base 310 facing away from the rotating plate 311 includes a tilting adjustment end 312 and a tilting rotating end 313 disposed relative to the tilting adjustment end 312. The tilting adjustment end 312 is located at an upper portion of the rotating base 310, and the tilting rotating end 313 is located at a lower portion of the rotating base 310. The tilting base 320 includes a rotating connecting portion 321 rotatably coupled to the tilting rotating end 313 and a sliding connecting portion 322 slidably coupled to the tilting adjustment end 312. The adjustment bracket 300 further includes a tilting adjustment bolt 330 passing through the tilting adjustment end 312 of the rotating base 310 and the sliding connection end 322 of the tilting base 320 to stabilize a rotating angle between the tilting base 320 and the rotating base 310. The tilting base 320 is rotatable about the tilting rotating end 313 and causes the sliding connecting portion 322 to slide relative to the tilting adjustment end 312. The tilting adjustment bolt 330 can adjust an inclination angle of the tilting base 320 relative to the rotating base 310 to adjust an angle of the display bracket 400 relative to the wall plate 100.

Furthermore, the display bracket 400 includes a fixed frame 410 and two hanging strips 420 that can be mounted on the fixed frame 410. The fixed frame 410 is fixed on the adjustment bracket 300, and the two hanging strips 420 can be fixed on a back of the display.

In this embodiment, the fixed frame 410 includes an upper fixed lever 411, a lower fixed end 412 disposed opposite to the upper fixed lever 411, and two side fixed levers 413 coupled between the upper fixed lever 411 and the lower fixed lever 412. The upper fixed lever 411 and the lower fixed lever 412 are respectively fixed to upper and lower ends of the tilting base 320. The hanging strips 420 can be mounted on the upper fixed lever 411 and the lower fixed lever 412 to enable the display with the hanging strips 420 to be mounted on the fixed frame 410. The display may be telescopic with respect to the wall plate 100 with the display bracket 400, and may be rotated in an horizontal direction and may be adjusted to an inclination angle in a vertical direction.

As the wall plate 100 includes a first pivoting part 110 and a second pivoting part 120, and the telescopic adjustment assembly 200 includes a first front rotating lever 210 and a second front rotating lever 220 respectively rotatably coupled to the first pivoting part 110 and the second pivoting part 120, and a rear rotating lever 250 rotatably coupled to the first front rotating lever 210 and the second front rotating lever 220, when the rear rotating lever 250 is in a closed state with respect to the wall plate 100, the adjustment bracket 300 may be received between the first pivoting part 110 and the second pivoting part 120, such that the display bracket 400 can be completely folded relative to the wall plate 100, and the central axis of the display is conveniently aligned with the central axis of the wall plate 100 to improve the user experience.

The above is a detailed description of the present disclosure. The above is only a preferred embodiment of the present disclosure, is not limited a scope of the present disclosure, that is, the average variation and modification according to the scope of the present disclosure should still be covered within the scope of the present disclosure.

What is claimed is:

1. A display mounting apparatus, comprising:
    a wall plate, a telescopic adjustment assembly, an adjustment bracket and a display bracket;
    wherein, the wall plate further comprises a first pivoting part and a second pivoting part disposed opposite to the first pivoting part; the telescopic adjustment assembly comprises a first front rotating lever, a second front rotating lever, a hollow sleeve, a middle rotating shaft, and a rear rotating lever; the first front rotating lever and the second front rotating lever are rotatably coupled to the first pivoting part and the second pivoting part respectively;
    the hollow sleeve is rotatably coupled between the first front rotating lever and the second front rotating lever; the middle rotating shaft sequentially passes through the first front rotating lever, the hollow sleeve and the second front rotating lever; one end of the rear rotating lever is fixed to a portion between two ends of the hollow sleeve;
    the adjustment bracket is rotatably coupled to one end of the rear rotating lever away from the hollow sleeve; when the display bracket is folded relative to the wall plate, the adjustment bracket is received between the first pivoting part and the second pivoting part;
    wherein, the telescopic adjustment assembly further comprises a first front pipe plug, a second front pipe plug, a first front rotating shaft, and a second front rotating shaft the first front rotating lever has an intermediate hollow tubular structure; the second front rotating lever has an intermediate hollow tubular structure; the first front pipe plug and the second front pipe plug are respectively inserted into one end of the first front rotating lever, and one end of the second front rotating lever; the first front rotating shaft passes through the end of the first front rotating lever and the first front pipe plug and is then rotatably coupled to the first pivoting part; the second front rotating shaft passes through the end of the second front rotating lever end and the second front pipe plug, and is then rotatably coupled to the second pivoting part.

2. The display mounting apparatus according to claim 1, wherein the first pivoting part comprises a first upper clamping plate and a first lower clamping plate disposed opposite to the first upper clamping plate; one end of the first front rotating lever rotatably couples the first upper clamping plate and the first lower clamping plate;
    the second pivoting part comprises a second upper clamping plate and a second lower clamping plate disposed opposite to the second upper clamping plate; one end of the second front rotating lever rotatably couples the second upper clamping plate and the second lower clamping plate.

3. The display mounting apparatus according to claim 2, wherein the wall plate comprises a first upper through hole, a first lower through hole, a first second upper through hole, and a second lower through hole which are arranged in order;
    the first upper clamping plate, the first lower clamping plate, the second upper clamping plate, and the second lower clamping plate are respectively disposed at edges of the first upper through hole; the first lower through hole, the first upper through hole, and the second lower through hole.

4. The display mounting apparatus according to claim 3, wherein the wall plate comprises an upper fixed end and a lower fixed end disposed opposite to the upper fixed end, and a supporting part disposed between the upper fixed end and the lower fixed end;

the first upper through hole, the first lower through hole, the second upper through hole and the second lower through hole, and the first upper clamping plate, the first lower clamping plate, the second upper clamping plate, and the second lower clamping plate are all disposed on the supporting part.

5. The display mounting apparatus according to claim 1, wherein the telescopic adjustment assembly further comprises a first plastic spacer and a second plastic spacer; the first plastic spacer and the second plastic spacer are respectively fixed on two ends of the hollow sleeve, and are further respectively abutting against the first front rotating lever and the second front rotating lever; the middle rotating shaft passes through the first plastic spacer and the second plastic spacer.

6. The display mounting apparatus according to claim 1, wherein the adjustment bracket comprises a rotating base that rotatably connects the rear rotating lever and a tilting base that rotatably connects the rotating base;

a rotating direction of the rotating base rotating relative to the rear rotating lever is parallel to a rotating direction of the front rotating lever rotating relative to the first front rotating lever; a rotating direction of the tilting base rotating relative to the rotating base is perpendicular to a rotating direction of the rotating base rotating relative to the rear rotating lever, the display bracket is fixed on the tilting base.

7. The display mounting apparatus according to claim 6, wherein the adjustment bracket further comprises a tilting adjustment bolt; the tilting adjustment bolt passes through the rotating base and the tilting base to stabilize a rotating angle of the tilting base relative to the rotating base.

8. The display mounting apparatus according to claim 1, wherein the display bracket comprises a fixed frame and two hanging strips mounted to the fixed frame; the fixed frame is fixed on the adjustment bracket; the two hanging strips can be fixed to a back of a display.

9. A display mounting apparatus, comprising: a wall plate, a telescopic adjustment assembly, an adjustment bracket and a display bracket; wherein, the wall plate comprises a first pivoting part and a second pivoting part disposed opposite to the first pivoting part; the telescopic adjustment assembly comprises a first front rotating lever, a second front rotating lever, a hollow sleeve, a middle rotating shaft, and a rear rotating lever; the first front rotating lever and the second front rotating lever are rotatably coupled to the first pivoting part and the second pivoting part respectively; the hollow sleeve is rotatably coupled between the first front rotating lever and the second front rotating lever; the middle rotating shaft sequentially passes through the first front rotating lever, the hollow sleeve and the second front rotating lever; one end of the rear rotating lever is fixed to a portion between two ends of the hollow sleeve; the adjustment bracket is rotatably coupled to one end of the rear rotating lever away from the hollow sleeve; when the display bracket is folded relative to the wall plate, the adjustment bracket is received between the first pivoting part and the second pivoting part; wherein, the telescopic adjustment assembly further comprises a rear pipe plug and a rear rotating shaft; the rear rotating lever has an intermediate hollow tubular structure; the rear pipe plug is inserted into one end of the rear rotating lever away from the hollow sleeve; and the rear rotating shaft passes through one end of the rear rotating lever and the rear pipe plug, and is then rotatably coupled to the adjustment bracket.

10. The display mounting apparatus according to claim 9, wherein, the first pivoting part comprises a first upper clamping plate and a first lower clamping plate disposed opposite to the first upper clamping plate; one end of the first front rotating lever rotatably couples the first upper clamping plate and the first lower clamping plate; the second pivoting part comprises a second upper clamping plate and a second lower clamping plate disposed opposite to the second upper clamping plate; one end of the second front rotating lever rotatably couples the second upper clamping plate and the second lower clamping plate.

11. The display mounting apparatus according to claim 10, wherein, the wall plate comprises a first upper through hole, a first lower through hole, a second upper through hole, and a second lower through hole which are arranged in order; the first upper clamping plate, the first lower clamping plate, the second upper clamping plate, and the second lower clamping plate are respectively disposed at edges of the first upper through hole; the first lower through hole, the first upper through hole, and the second lower through hole.

12. The display mounting apparatus according to claim 11, wherein, the wall plate comprises an upper fixed end and a lower fixed end disposed opposite to the upper fixed end, and a supporting part disposed between the upper fixed end and the lower fixed end; the first upper through hole, the first lower through hole, the second upper through hole and the second lower through hole, and the first upper clamping plate, the first lower clamping plate, the second upper clamping plate, and the second lower clamping plate are all disposed on the supporting part.

13. The display mounting apparatus according to claim 9, wherein, the telescopic adjustment assembly further comprises a first plastic spacer and a second plastic spacer; the first plastic spacer and the second plastic spacer are respectively fixed on two ends of the hollow sleeve, and are further respectively abutting against the first front rotating lever and the second front rotating lever; the middle rotating shaft passes through the first plastic spacer and the second plastic spacer.

14. The display mounting apparatus according to claim 9, wherein, the adjustment bracket comprises a rotating base that rotatably connects the rear rotating lever and a tilting base that rotatably connects the rotating base; a rotating direction of the rotating base rotating relative to the rear rotating lever is parallel to a rotating direction of the front rotating lever rotating relative to the first front rotating lever; a rotating direction of the tilting base rotating relative to the rotating base is perpendicular to a rotating direction of the rotating base rotating relative to the rear rotating lever, the display bracket is fixed on the tilting base.

15. The display mounting apparatus according to claim 14, wherein, the adjustment bracket further comprises a tilting adjustment bolt; the tilting adjustment bolt passes through the rotating base and the tilting base to stabilize a rotating angle of the tilting base relative to the rotating base.

16. The display mounting apparatus according to claim 9, wherein, the display bracket comprises a fixed frame and two hanging strips mounted to the fixed frame; the fixed frame is fixed on the adjustment bracket; the two hanging strips can be fixed to a back of a display.

* * * * *